(12) United States Patent
Kim

(10) Patent No.: US 11,841,456 B2
(45) Date of Patent: *Dec. 12, 2023

(54) RADAR APPARATUS AND RADAR SIGNAL PROCESSING METHOD

(71) Applicant: SMART RADAR SYSTEM, INC., Seongnam-si (KR)

(72) Inventor: Yong Jae Kim, Seoul (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,997

(22) Filed: Oct. 24, 2021

(65) Prior Publication Data

US 2022/0043109 A1 Feb. 10, 2022

Related U.S. Application Data

(63) Continuation of application No. 16/373,636, filed on Apr. 3, 2019, now Pat. No. 11,187,785.

(30) Foreign Application Priority Data

Jan. 8, 2019 (KR) .................. 10-2019-0002485

(51) Int. Cl.
*G01S 7/35* (2006.01)
*G01S 13/58* (2006.01)
(Continued)

(52) U.S. Cl.
CPC .............. *G01S 7/352* (2013.01); *G01S 13/50* (2013.01); *G01S 13/53* (2013.01); *G01S 13/584* (2013.01); *G01S 13/726* (2013.01); *G01S 7/356* (2021.05)

(58) Field of Classification Search
CPC .......... G01S 7/352; G01S 13/50; G01S 13/53; G01S 13/584; G01S 13/726; G01S 7/356;
(Continued)

(56) References Cited

U.S. PATENT DOCUMENTS 7,579,982 B2 8/2009 Matsuoka
2011/0080314 A1 4/2011 Wintermantel
(Continued)

FOREIGN PATENT DOCUMENTS

KR 10-2018-0060341 A 6/2018
KR 10-2019171 B1 9/2019

OTHER PUBLICATIONS

Korean office action dated Apr. 7, 2020 for Korean Application No. 10-2019-0002485.
(Continued)

*Primary Examiner* — Donald H B Braswell
(74) *Attorney, Agent, or Firm* — INSIGHT LAW GROUP, PLLC; Seung Lee

(57) ABSTRACT

A radar apparatus and a radar signal processing method are provided. The radar apparatus includes a plurality of transmitting antennas, a plurality of non-uniformly and linearly deployed receiving antennas, a sensor signal processor configured to calculate target range-Doppler data from signals input from a receiving antenna arrangement according to virtual antennas while sequentially driving the plurality of transmitting antennas, and a target position calculator configured to calculate position data of a target from arrangement mapped data obtained by rearranging the virtual antenna-specific range-Doppler data output from the sensor signal processor with reference to antenna configuration related information.

18 Claims, 13 Drawing Sheets

(51) Int. Cl.
  *G01S 13/72* (2006.01)
  *G01S 13/50* (2006.01)
  *G01S 13/53* (2006.01)

(58) Field of Classification Search
  CPC .......... G01S 7/028; G01S 13/34; G01S 13/44; G01S 7/42; G01S 7/021; G01S 13/583
  See application file for complete search history.

(56) References Cited

U.S. PATENT DOCUMENTS

| | | | | |
|---|---|---|---|---|
| 2015/0372744 | A1* | 12/2015 | Lehtinen | H04B 7/0671 370/329 |
| 2017/0139042 | A1 | 5/2017 | Alenljung et al. | |
| 2018/0231656 | A1* | 8/2018 | Maher | G01S 7/285 |
| 2019/0115670 | A1* | 4/2019 | Kishigami | G01S 13/003 |
| 2019/0369223 | A1* | 12/2019 | Yoshida | G01S 13/30 |
| 2020/0049812 | A1* | 2/2020 | Jansen | G01S 13/4454 |
| 2020/0225337 | A1 | 7/2020 | Kishigami | |
| 2021/0156982 | A1* | 5/2021 | Stettiner | G01S 7/0232 |

OTHER PUBLICATIONS

Zhengyu Pen et al., "Design and Calibration of a Portable 24-GHz 3-D MIMO FMCW Radar with a Non-uniformly Spaced Array and RF Front-End Coexisting on the Same PCB Layer", 2018 IEEE 13th Dallas Circuits and Systems Conference (DCAS), IEEE, Nov. 12, 2018 (Nov. 12, 2018), pp. 1-4, XP033505399, DOI: 10.1109/DCAS.2018.8620117.

Sandeep Rao: "MIMO Radar", Jul. 26, 2018 (Jul. 26, 2018), pp. 1-13, XP055609875.

Extended European Search Report dated Sep. 9, 2019 for European Application No. 19167492.8.

Non-final office action dated May 26, 2021 for U.S. Appl. No. 16/373,636.

Notice of Allowance dated Oct. 6, 2021 for U.S. Appl. No. 16/373,636.

* cited by examiner

FIG. 10

RADAR APPARATUS AND RADAR SIGNAL PROCESSING METHOD

CROSS-REFERENCE TO RELATED APPLICATION(S)

This application is a continuation application of U.S. application Ser. No. 16/373,636, filed Apr. 3, 2020 (now pending), which claims priority from Korean Patent Application No. 10-2019-0002485, filed on Jan. 8, 2019, in the Korean Intellectual Property Office, the disclosure of which is incorporated herein by reference in its entirety.

BACKGROUND

1. Field

The following description relates to a radar technology and more particularly, to a radar apparatus having multiple transmitting antennas and multiple receiving antennas and a radar signal processing method.

2. Description of Related Art

There is a known technique for increasing the spatial resolution of a radar apparatus in which multiple transmitting antennas and multiple receiving antennas are deployed by sequentially driving the transmitting antennas and the receiving antennas.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a radar apparatus which has a higher spatial resolution using the same number of antennas.

The following description relates to a technical solution which makes it possible for a radar apparatus to have a plurality of different characteristics while having a fixed antenna arrangement.

In one general aspect, a radar apparatus includes a plurality of transmitting antennas and a plurality of receiving antennas which are non-uniformly and linearly deployed. While the transmitting antennas are sequentially driven, signals input from the receiving antennas are processed in consideration of the non-uniform linear arrangement of the receiving antennas so that position data of a target is calculated.

In an additional aspect, while the transmitting antennas are sequentially driven, radar signals are received from the receiving antennas and processed. Therefore, it is possible to implement a greater number of virtual antennas or virtual receiving channels than physical antennas, and wide coverage is effectively achieved by a non-uniform linear arrangement of the virtual antennas or the virtual receiving channels.

In an additional aspect, a plurality of antenna arrangements are intended by designing antennas to be driven and designing a driving sequence of the antennas in a physically fixed antenna arrangement. It is possible to detect and track a plurality of different targets with one physical radar by selectively applying a plurality of antenna arrangements.

Other features and aspects will be apparent from the following detailed description, the drawings, and the claims.

BRIEF DESCRIPTION OF THE DRAWINGS

FIG. 10 is a diagram illustrating another example of antenna configuration related information.

Figure 1:
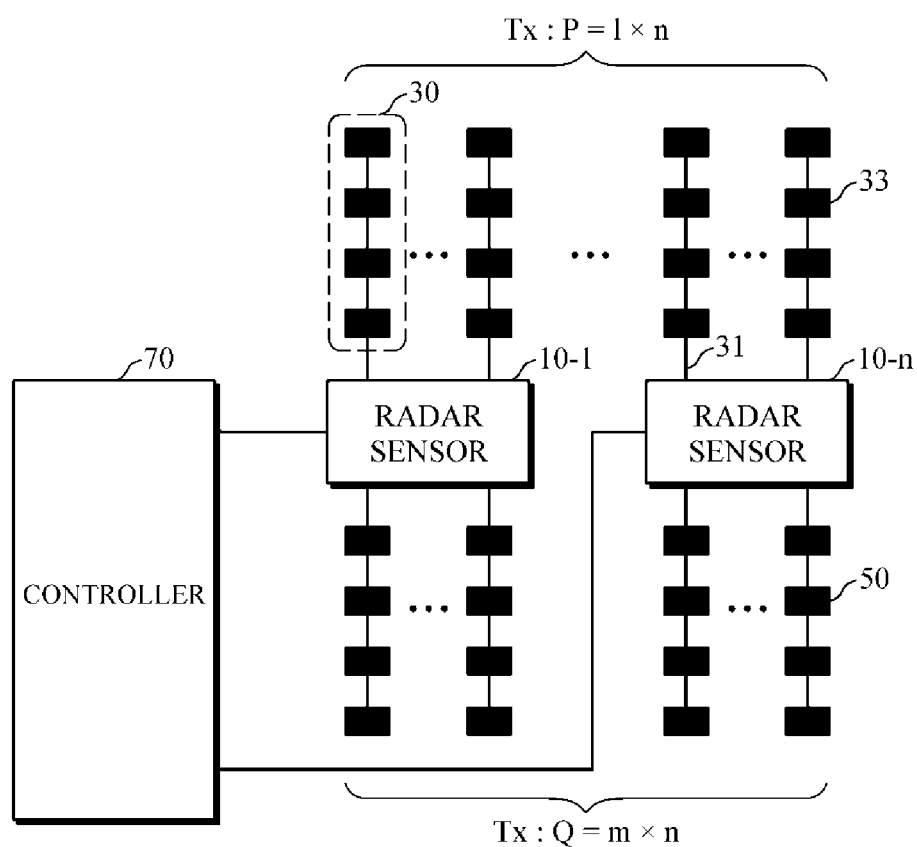
FIG. 1 shows an overall configuration of a radar apparatus according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects of the present invention will become more apparent from exemplary embodiments which will be described with reference to the accompanying drawings. It is understood that elements of each embodiment may be combined in a variety of ways within the embodiment unless otherwise indicated or contradictory.

FIG. 1 shows an overall configuration of a radar apparatus according to an exemplary embodiment of the present invention. The radar apparatus according to an exemplary embodiment of the present invention includes a plurality of radar sensors 10-1, 10-2, . . . , and 10-$n$ and a controller 70 which controls the radar sensors 10-1, 10-2, . . . , and 10-$n$ in an integrated manner. Each of the radar sensors 10-1, 10-2, . . . , and 10-$n$ has $l$ transmitting channels and $m$ receiving channels and is connected to $l$ transmitting antennas and $m$ receiving antennas. As shown in the drawing, each antenna 30 may include a feeding line 31 and a plurality of patches 33 arranged along the feeding line 31. When the patches 33 having different or identical sizes are arranged along the feeding line 31, a directional characteristic of the individual antenna 30 may be designed by adjusting intervals between the patches 33. According to an exemplary embodiment of the present invention, the radar sensors 10-1, 10-2, . . . , and 10- may be a commercialized single frequency-modulated continuous wave (FMCW) radar sensor semiconductor.

Figure 2:
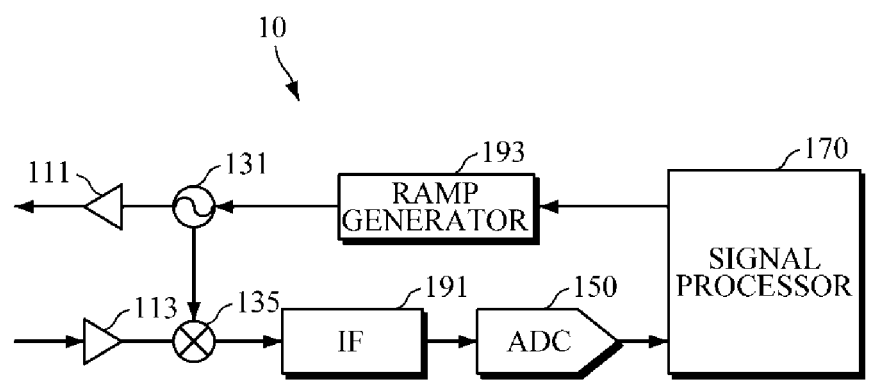
FIG. 2 is a block diagram showing a configuration of one transmitting and receiving channel of a sensor signal processor according to an exemplary embodiment of the present invention.

FIG. 2 is a block diagram showing a configuration of one transmitting and receiving channel of a radar sensor 10 according to an exemplary embodiment of the present invention. The transmitting channel includes a ramp generator 193 for controlling an FMCW oscillation frequency, a variable oscillator 131, and a power amplifier 111. The receiving channel includes a low-noise amplifier 113, a down converter 135, an intermediate frequency processor 191, and an analog-to-digital converter (ADC) 150. A signal processor 170 controls the radar sensor 10 according to internal firmware and includes a dedicated circuit, a microprocessor, and a digital signal processor. The radar sensor 10 according to an exemplary embodiment of the present invention has four receiving channels and three transmitting channels in a single chip. The radar sensor 10 is connected to an external controller through a serial interface and thus is programmable. The signal processor 170 controls the variable oscillator 131 to generate an FMCW radar signal. Also, the signal processor 170 may process a digital radar signal output from the ADC 150 by programming the internal microprocessor and digital signal processor.

According to an aspect, the radar apparatus is connected to an antenna arrangement including a plurality of transmitting antennas and a plurality of receiving antennas. According to an aspect, the plurality of transmitting antennas and/or the plurality of receiving antennas are non-uniformly and linearly deployed. As an example, the plurality of transmitting antennas may be non-uniformly and linearly deployed, and the plurality of receiving antennas may be uniformly and linearly deployed. As another example, the plurality of transmitting antennas may be uniformly and linearly deployed, and the plurality of receiving antennas may be non-uniformly and linearly deployed. As another example, all the plurality of transmitting antennas and all the plurality of receiving antennas may be separately, non-uniformly, and linearly deployed.

In "non-uniformly and linearly deployed," "linearly deployed" denotes that multiple antennas are deployed along a straight line or a curved line. Also, "non-uniformly deployed" denotes that intervals between antennas are not regular. The present invention does not preclude a two-dimensional arrangement. For example, when transmitting antennas are alternately deployed in two lines and receiving antennas are linearly deployed, a virtual antenna arrangement may have a higher density. In other words, the term "non-uniformly and linearly deployed" is defined to denote an arrangement of antennas including a part in which antennas are linearly deployed at irregular intervals. Transmitting antennas and receiving antennas may be deployed so that a line of the transmitting antennas and a line of the receiving antennas cross each other.

Korean Unexamined Patent Application No. 10-2018-0035463 filed by the present applicant on Mar. 27, 2018 discloses examples in which antennas are non-uniformly and linearly deployed. FIGS. 3 and 4 show exemplary embodiments of a non-uniform linear arrangement of antennas disclosed in the earlier application.

Figure 3A:
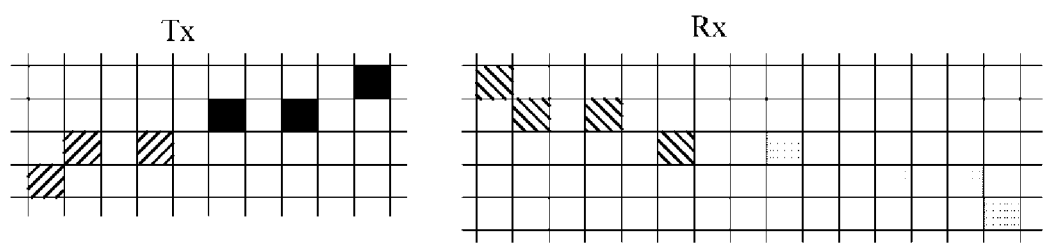
FIGS. 3A, 3B, 4A and 4B show exemplary embodiments of a non-uniform linear arrangement of antennas.

FIG. 3A shows physical arrangements of transmitting antennas and receiving antennas according to an exemplary embodiment of the present invention. In the exemplary embodiment shown in the drawing, six transmitting antennas Tx and eight receiving antennas Rx are deployed along separate curved lines. Horizontal intervals between the transmitting antennas and horizontal intervals between the receiving antennas are values of 0 to 2 units, that is, the transmitting antennas and the receiving antennas are deployed at irregular horizontal intervals. Also, vertical intervals between the transmitting antennas and vertical intervals between the receiving antennas are values of 0 to 1 unit, that is, the transmitting antennas and the receiving antennas are deployed more closely in the vertical direction than in the horizontal direction but likewise at irregular intervals.

Figure 3B:
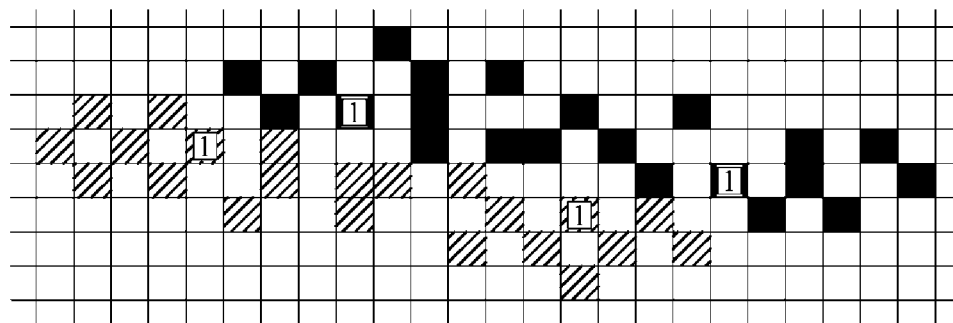

FIG. 3B shows a distribution of received beams which are received through the receiving antennas while the transmitting antennas are sequentially driven in the antenna arrangement according to the exemplary embodiment shown in FIG. 3A. Since intervals between the transmitting and receiving antennas are greater in the horizontal direction than in the vertical direction, the received beams are distributed more widely in the horizontal direction than in the vertical direction.

The distribution of received beams is the same as the distribution of beams received when the transmitting and receiving antennas physically deployed at the same positions are individually driven. Therefore, in this specification, the arrangement of individual antennas which have the same distribution of received beams as a case in which a plurality of transmitting antennas and a plurality of receiving antennas included in an arrangement are sequentially scanned is referred to as an "equivalent virtual antenna arrangement."

As shown in FIG. 3B, when the plurality of transmitting and receiving antennas are deployed along curved lines at irregular intervals, some positions in the distribution of received beams are empty, but there is a concentrated monitoring region. Also, as shown in FIG. 3B, distribution intervals between received beams in the received beam distribution, that is, antenna distribution intervals of a virtual antenna arrangement, are less than half a received wavelength. Accordingly, it is possible to prevent generation of an undesirable grating lobe.

Figure 4A:
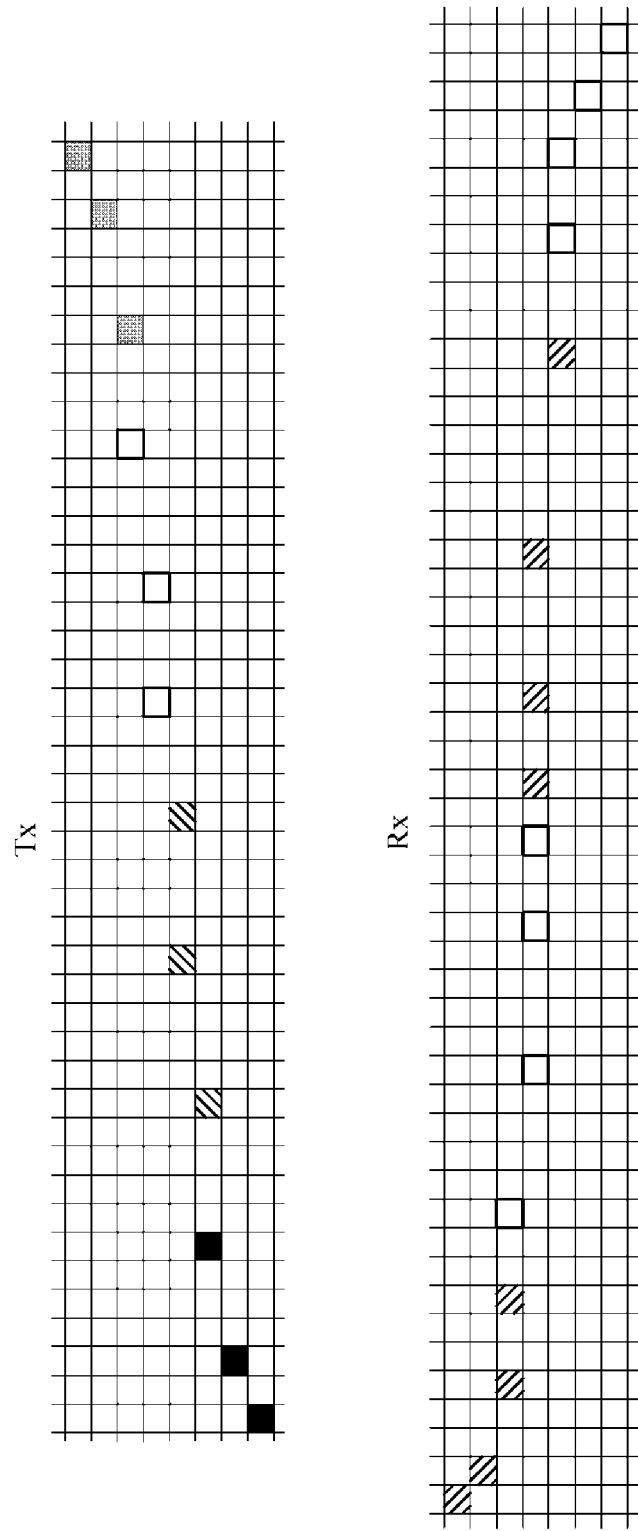

FIG. 4A shows a physical arrangement of transmitting antennas and receiving antennas according to another exemplary embodiment of the present invention. In the exemplary embodiment shown in the drawing, 12 transmitting antennas Tx and 16 receiving antennas Rx are deployed along separate curved lines. Horizontal intervals between the transmitting antennas and horizontal intervals between the receiving antennas are values of 0 to 4 units, that is, the transmitting antennas and the receiving antennas are deployed at irregular horizontal intervals. Also, vertical intervals between the transmitting antennas and vertical intervals between the receiving antennas are values of 0 to 1 unit, that is, the transmitting antennas and the receiving antennas are deployed more closely in the vertical direction than in the horizontal direction but at irregular intervals likewise.

Figure 4B:
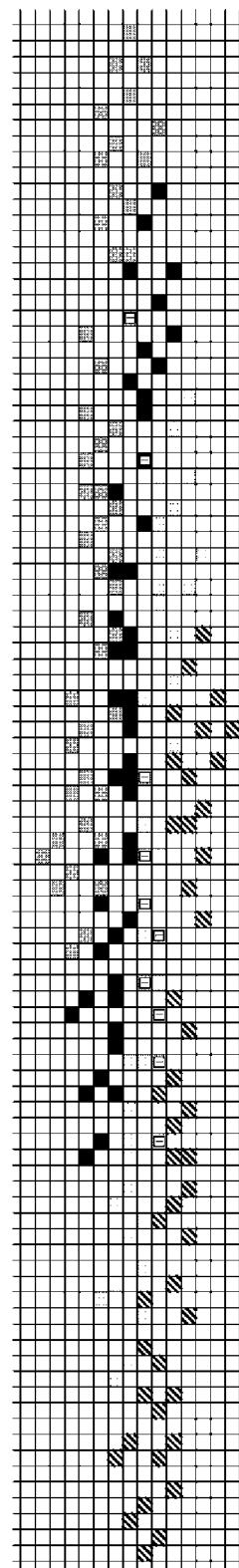

FIG. 4B shows the distribution of virtual antennas or the distribution of received beams which are received through the receiving antennas while the transmitting antennas are sequentially driven in the antenna arrangement according to the exemplary embodiment shown in FIG. 4A. Since intervals between the transmitting and receiving antennas are greater in the horizontal direction than in the vertical direction, the received beams are distributed more widely in the horizontal direction than in the vertical direction. When the 12 transmitting antennas and the 16 receiving antennas are sequentially driven, it is possible to obtain the same effect as a case in which 192 virtual antennas are spatially deployed.

As shown in the exemplary embodiments shown in the drawings, a virtual antenna arrangement corresponding to a physical antenna arrangement may be calculated by adding all patterns which are obtained by shifting driven physical transmitting antennas to the positions of driven physical receiving antennas. For this reason, even when the transmitting antennas or the receiving antennas are deployed at regular intervals along a straight line or a curved line and the receiving antennas or the transmitting antennas are non-uniformly and linearly deployed, it is possible to achieve spatially wide coverage proposed by the present invention.

Figure 5:
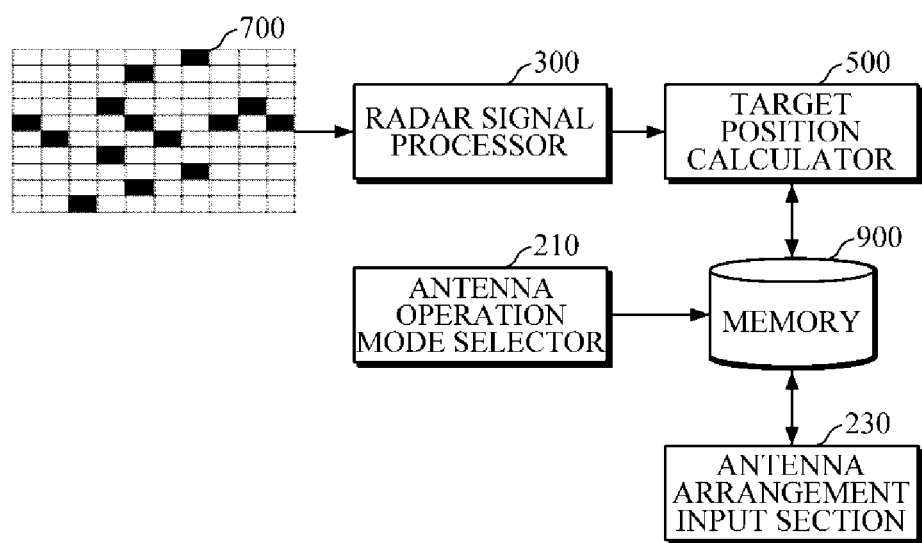
FIG. 5 is a block diagram showing a configuration of a radar apparatus according to an exemplary embodiment of the present invention.

[Description of FIG. 5—Claim 1]

FIG. 5 is a block diagram showing a configuration of a radar apparatus according to an exemplary embodiment of the present invention. According to an aspect, the radar apparatus includes a memory 900, a sensor signal processor 300, and a target position calculator 500. The memory 900 stores antenna configuration related information. The antenna configuration related information is determined according to the arrangement of antennas. The antenna configuration related information is determined according to the shape of a physical antenna arrangement and, more directly, according to an arrangement of virtual antennas derived from the physical antenna arrangement. According to an aspect, the antenna arrangement includes a plurality of transmitting antennas and a plurality of receiving antennas. The plurality of transmitting antennas and/or the plurality of receiving antennas are non-uniformly and linearly deployed. In this specification, "antenna configuration related information" is defined as information which reflects a physical static arrangement of a plurality of transmitting antennas and a plurality of receiving antennas. According to an additional aspect, "antenna configuration related information" may be determined according to a dynamic operation sequence of the plurality of transmitting antennas and the plurality of receiving antennas. Such antenna configuration related information may be information reflecting a calculation sequence of range and Doppler data among virtual antennas.

While sequentially driving the plurality of transmitting antennas, the sensor signal processor 300 calculates target range-Doppler data according to virtual antennas from signals input from the receiving antenna arrangement. Here, range data denotes a radial distance to a target, and Doppler data denotes a value related to radial speed. For example, when four transmitting antennas which are non-uniformly and linearly deployed are (Tx1, Tx2, Tx3, Tx4) and six receiving antennas which are non-uniformly and linearly deployed are (Rx1, Rx2, Rx3, Rx4, Rx5, and Rx6), the sensor signal processor 300 according to an exemplary embodiment of the present invention sends a radar signal at Tx1 first and receives six signals at the receiving antennas Rx1, Rx2, Rx3, Rx4, Rx5, and Rx6 in the transmitting and receiving antenna arrangement. Subsequently, the sensor signal processor 300 sends a radar signal at Tx2 and receives six signals at the receiving antennas Rx1, Rx2, Rx3, Rx4, Rx5, and Rx6. Subsequently, the sensor signal processor 300 sends a radar signal at Tx3 and receives six signals at the receiving antennas Rx1, Rx2, Rx3, Rx4, Rx5, and Rx6. Subsequently, the sensor signal processor 300 sends a radar signal at Tx4 and receives six signals at the receiving antennas Rx1, Rx2, Rx3, Rx4, Rx5, and Rx6, thereby finishing one transmission and reception cycle.

Figure 6:
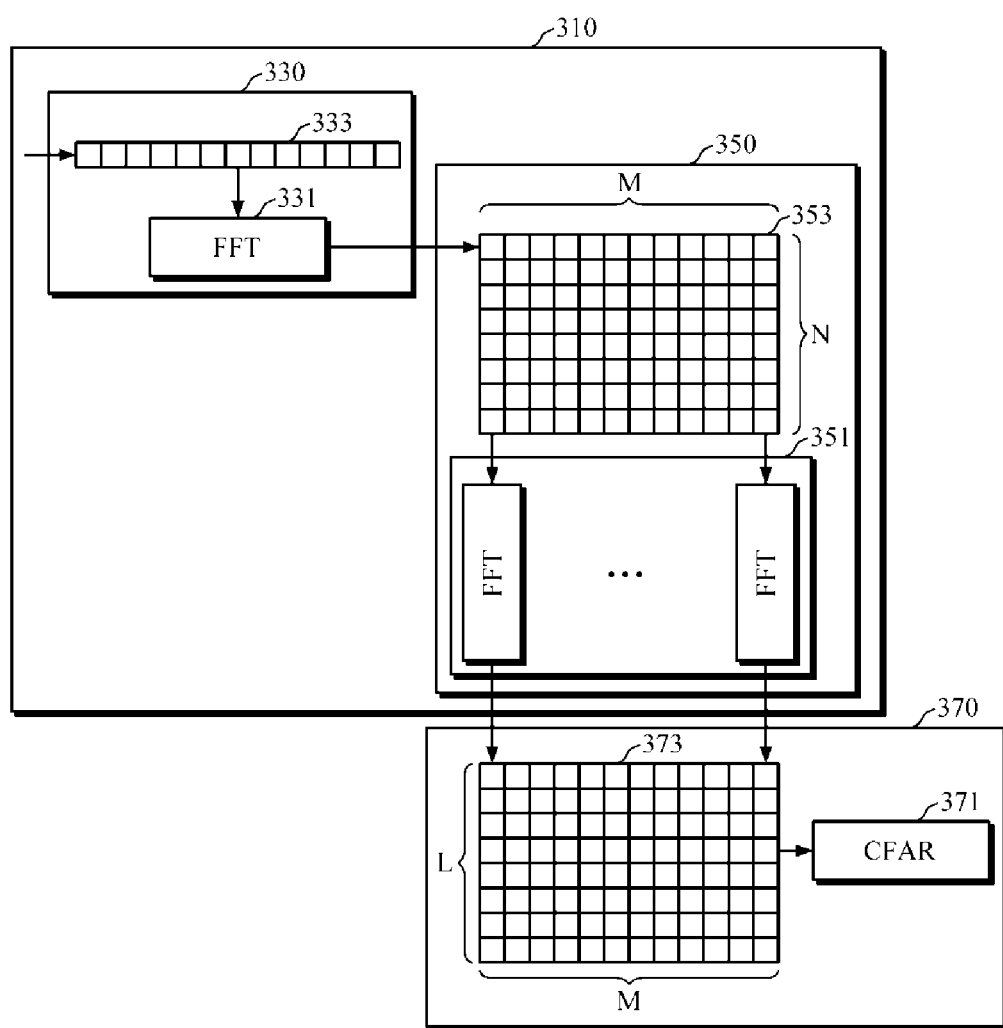
FIG. 6 is a block diagram showing a configuration of a sensor signal processor which processes a signal received by one virtual antenna according to an exemplary embodiment of the present invention.

Calculating target range-Doppler data from a received radar signal is a well-known method. FIG. 6 is a block diagram showing a configuration of the sensor signal processor 300 which processes a signal received by one virtual antenna according to an exemplary embodiment of the present invention. As shown in the drawing, the sensor signal processor 300 according to an exemplary embodiment of the present invention includes a range and Doppler processor 310 and a target selector 370. While sequentially driving the plurality of transmitting antennas, the range and Doppler processor 310 calculates range-Doppler data according to virtual antennas from signals input through the plurality of receiving antennas.

The range and Doppler processor 310 may include a target range calculator 330 and a Doppler processor 350. The target range calculator 330 calculates range data according to virtual antennas from the signals input through the receiving antennas. The target range calculator 330 samples FMCW digital radar signals input through the antennas and stores the FMCW digital radar signals in units of modulation periods, and a one-dimensional Fourier transformer 331 performs a Fourier transformation and outputs M pieces of range data, that is, Fourier coefficients.

The Doppler processor 350 calculates range-Doppler data according to virtual antennas by processing the calculated range data. The Doppler processor 350 stores N pieces of range data, which is M range index-specific coefficient values output from the target range calculator 330, in a two-dimensional memory 353 in a row direction. A two-dimensional Fourier transformer 351 accesses the two-dimensional memory 353 in a column direction, which is a time-axis direction, and generates M pieces of range-Doppler data, which are L Fourier coefficients, by performing Fourier transformations on N pieces of range data. The M×N pieces of data have range information in the row direction and have Doppler information in the column direction and are referred to as range-Doppler data. Row direction indices of the memory array are referred to as range indices, and column direction indices are referred to as Doppler indices.

Subsequently, the target selector 370 selects a position of a value which is highly likely to be a signal of the actual target from among values 373 represented as (a range index, a Doppler index) using a constant false alarm rate (CFAR) algorithm 371 and the like. For example, such signal processing is applied to each of all the virtual antennas shown in FIG. 3B or FIG. 4B. The target selector 370 provides only selected pieces of data to the target position calculator 500 among (a range index, a Doppler index) pairs so that data processing may be reduced.

Referring back to FIG. 5, according to an aspect, the target position calculator 500 calculates position data of a target from arrangement mapped data which is obtained by rearranging virtual antenna-specific range-Doppler data output from the sensor signal processor 300 according to a two-dimensional arrangement of virtual antennas with reference to the antenna configuration related information. The arrangement mapped data denotes a computable data arrangement which has been rearranged so that a target position may be calculated according to general radar signal processing. According to an aspect, the arrangement mapped data may denote data obtained by rearranging range-Doppler data of a target in consideration of the arrangement of virtual antennas, that is, by mapping target range-Doppler data to the arrangement of virtual antennas, so that a target position may be calculated.

Figure 7:
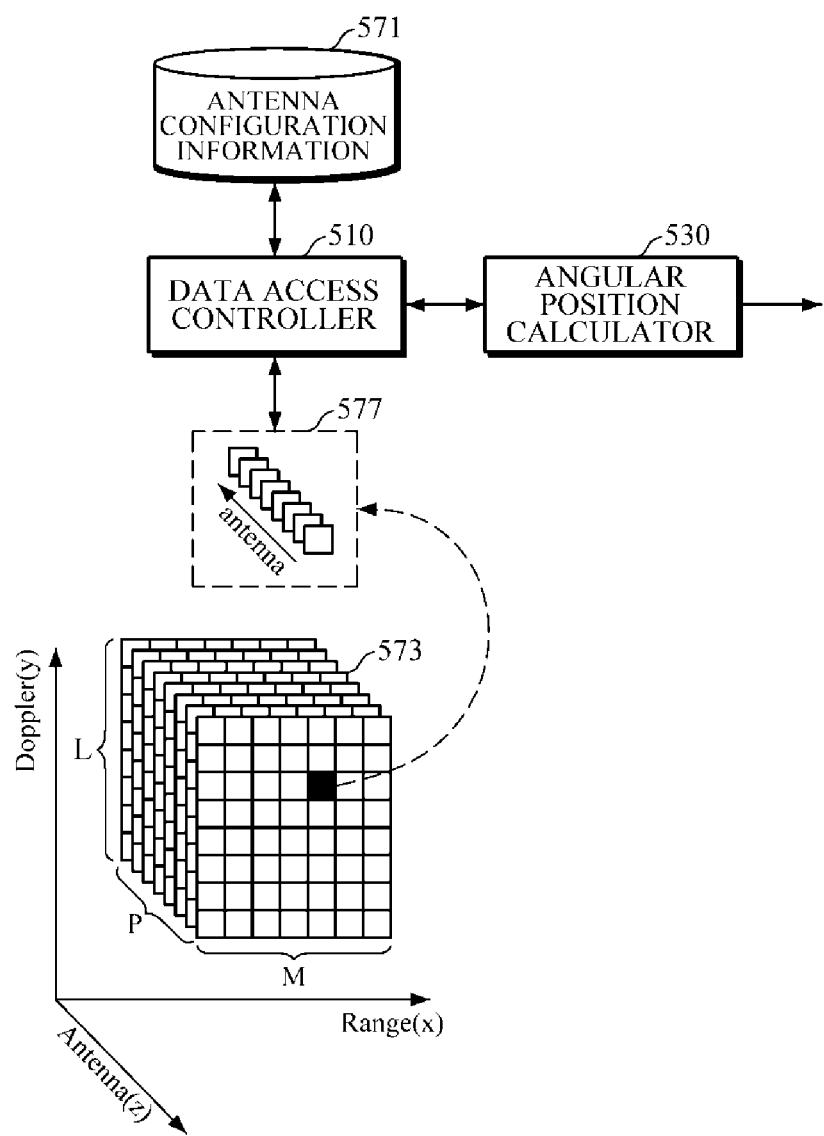
FIG. 7 is a block diagram showing a configuration of a target position calculator according to an exemplary embodiment of the present invention.

[Description of FIG. 7—Detailed Position Calculation of Claims 4 and 5]

FIG. 7 is a block diagram showing a configuration of the target position calculator 500 according to an exemplary embodiment of the present invention. The target position calculator 500 according to an exemplary embodiment of the present invention includes a data access controller 510 and an angular position calculator 530. The data access controller 510 rearranges selected virtual antenna-specific range-Doppler data 577 of targets into target-specific arrangement mapped data according to a two-dimensional arrangement of virtual antennas with reference to antenna configuration related information 571 and outputs the target-specific arrangement mapped data.

As shown in the drawing, a range-Doppler data set 573 is a three-dimensional data set in which M×L range-Doppler data is arranged for each of P virtual antennas. As shown in a square formed of a dotted line, the data access controller 510 extracts range-Doppler data which has been determined to be highly likely to be a target by the target selector 370 of FIG. 6, that is, pieces of data at colored positions in the drawing, from M×L range-Doppler data on the basis of all of the P virtual antennas. A plurality of targets may be selected from the range-Doppler data set 573. The data access controller 510 rearranges the virtual antenna-specific range-Doppler data 577 into target-specific arrangement mapped data according to the two-dimensional arrangement of virtual antennas with reference to the antenna configuration related information 571 and outputs the target-specific arrangement mapped data.

The arrangement mapped data is data obtained by rearranging range-Doppler data which has been determined to be highly likely to be a target in the range-Doppler data set 573 so that the rearranged range-Doppler data may be matched to a spatial arrangement of virtual antennas. In other words, in FIG. 7, range-Doppler data 577 of one target in the range-Doppler data set 573 has been arranged in an array sequence of virtual antennas determined according to a data processing structure. However, the spatial arrangement of virtual antennas is non-uniform and linear as shown in FIG. 8.

Figure 8:
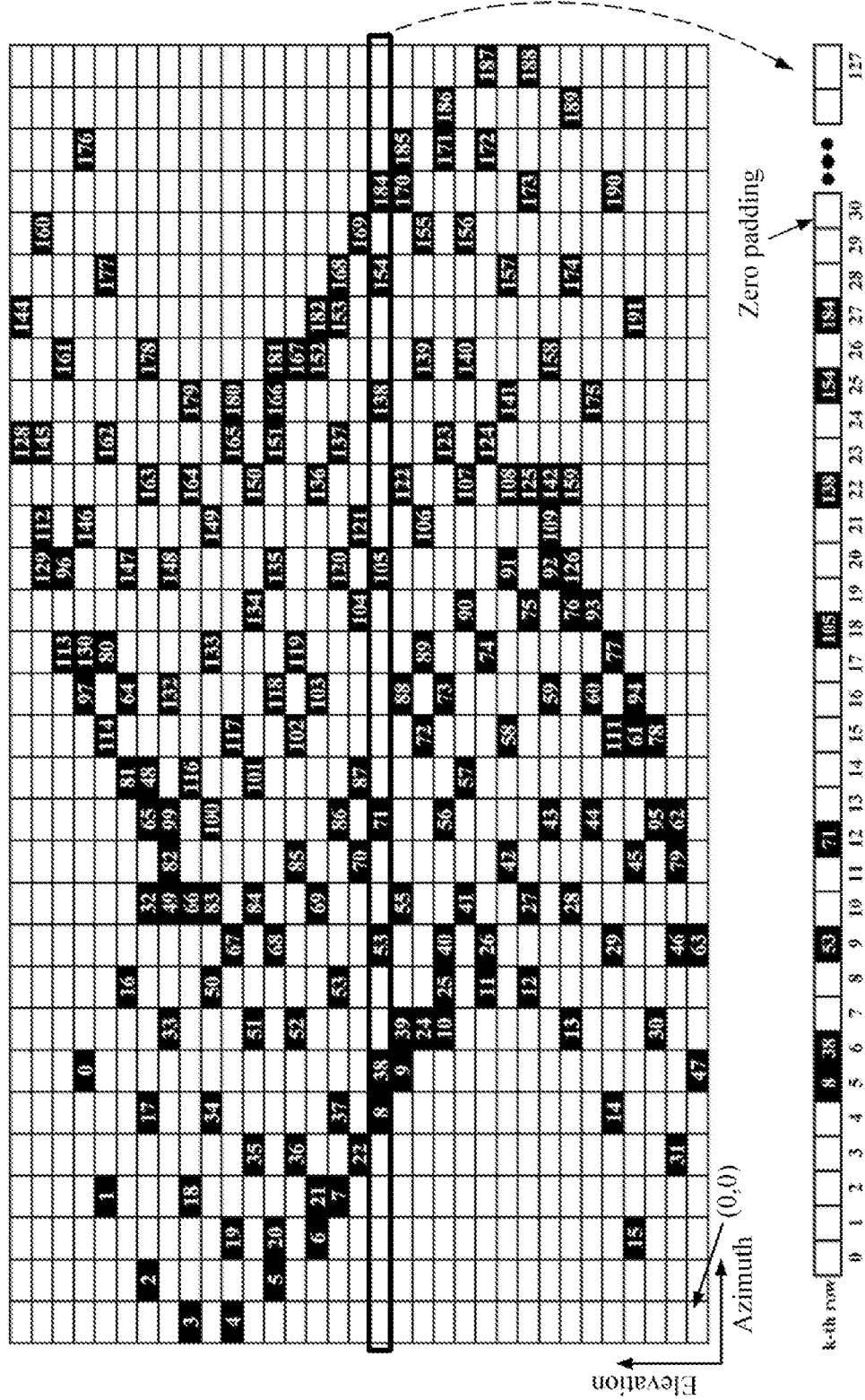
FIG. 8 shows an example of an arrangement of virtual antennas and one row extracted from the arrangement.

FIG. 8 shows an exemplary arrangement of 192 virtual antennas achieved by sequentially driving 12 transmitting antennas and 16 receiving antennas. Such an arrangement of virtual antennas has been shown in FIG. 3B as derived from the physical arrangement of FIG. 3A and FIG. 4B as derived from the physical arrangement of FIG. 4A. Virtual antennas are positioned in colored cells. No virtual antennas are positioned in empty cells, and range-Doppler data corresponding to the empty cells is filled with 0. Numbers recorded in the colored cells are orders or indices in a z-axis, which is the virtual antenna direction, in the range-Doppler data set 573 of FIG. 7. These orders are determined according to a data processing structure. In other words, the orders are determined according to in what sequence range-Doppler data generated for respective virtual antennas by the target range calculator 330 and the Doppler processor 350 in the exemplary embodiment shown in FIG. 6 is collected in a memory by the target selector 370. However, the spatial arrangement of virtual antennas is non-uniform and discrete as shown in FIG. 8. Therefore, it is impossible to apply a general existing angular position calculation method to data which is in the same state as the M×L range-Doppler data set 573 of FIG. 7.

In the range-Doppler data set 573 of FIG. 7, range-Doppler data of all the 192 virtual antennas is stored in the z-axis direction in a sequence according to such a data processing structure. However, it is necessary to rearrange the 192 virtual antennas to actually have spatial distribution as shown in FIG. 8. The data access controller 510 rearranges the range-Doppler data into arrangement mapped data according to targets in order of such a two-dimensional arrangement of virtual antennas with reference to the antenna configuration related information 571 and outputs the arrangement mapped data.

Two exemplary embodiments are proposed to rearrange range-Doppler data 577 of a specific target in the range-Doppler data set 573 into arrangement mapped data.

According to an aspect, the data access controller 510 extracts data corresponding to each address of the two-dimensionally arranged memory array of virtual antennas from selected range-Doppler data of a target which is one-dimensionally arranged according to the virtual antennas with reference to the antenna configuration related information 571 and stores the corresponding data. In a first exemplary embodiment, an output buffer of the data access controller 510 may have the length of an azimuth direction or an elevation direction in the virtual antenna arrangement. The buffer may have one of two sizes which is determined according to whether the angular position calculator 530 performs data processing in the azimuth direction or elevation direction first. For example, in FIG. 8, a kth azimuth direction row extracted from the upper virtual antenna arrangement is shown at the lower end. This row has a length of 128, and in this exemplary embodiment, the output buffer of the data access controller 510 may have a size of 128. The data access controller 510 outputs range-Doppler data corresponding to an azimuth direction row requested by the angular position calculator 530 in range-Doppler data 577 of one target extracted from the range-Doppler data set 573 of FIG. 7, that is, 128 pieces of data which are rearranged in order of $(0, 0, 0, 0, 0, 8^{th}, 38^{th}, 0, 0, 53^{rd}, \ldots)$ in the example shown at the lower end of FIG. 8, to the output buffer. When data processing of the azimuth direction row adopts a parallel structure in which data of a plurality of rows is simultaneously processed, the output buffer may be increased as many times as the number of rows processed in parallel. Also, when data of a plurality of targets is simultaneously processed, as many data access controllers 510 and angular position calculators as the number of targets simultaneously processed may be provided.

According to another aspect, the antenna configuration related information 571 may include information on the index of a virtual antenna of a corresponding position at each address of a memory array having the same size as the two-dimensional arrangement of virtual antennas. For example, the map shown in the upper side of FIG. 8 may be an example of the antenna configuration related information 571. A memory in which the antenna configuration related information 571 is stored is a memory array having the same size as the two-dimensional arrangement of virtual antennas, that is, a size of 128×128 in this case. At respective addresses of the memory array, indices of virtual antennas at positions corresponding to the addresses are recorded. In the exemplary embodiment shown in the drawing, cells which have no virtual antenna at the corresponding positions are filled with 0. Memory addresses of such "null" positions may be filled with a special character or a distinguishable number. The data access controller 510 extracts spatial arrangement information of virtual antennas of a part requested by the angular position calculator 530 by accessing the corresponding part of the memory in which the antenna configuration related information 571 is stored and records, in the output buffer, range-Doppler data acquired by accessing range-Doppler data 577 of one target with the index information. The data recorded in the output buffer may be arrangement mapped data.

The angular position calculator 530 calculates an angular position of each target from arrangement mapped data of the corresponding target. The angular position calculator 530 may also calculate an angular position of a corresponding target by processing the rearranged arrangement mapped data in the same manner as radar signals to general antennas which are uniformly and linearly deployed.

Figure 9:
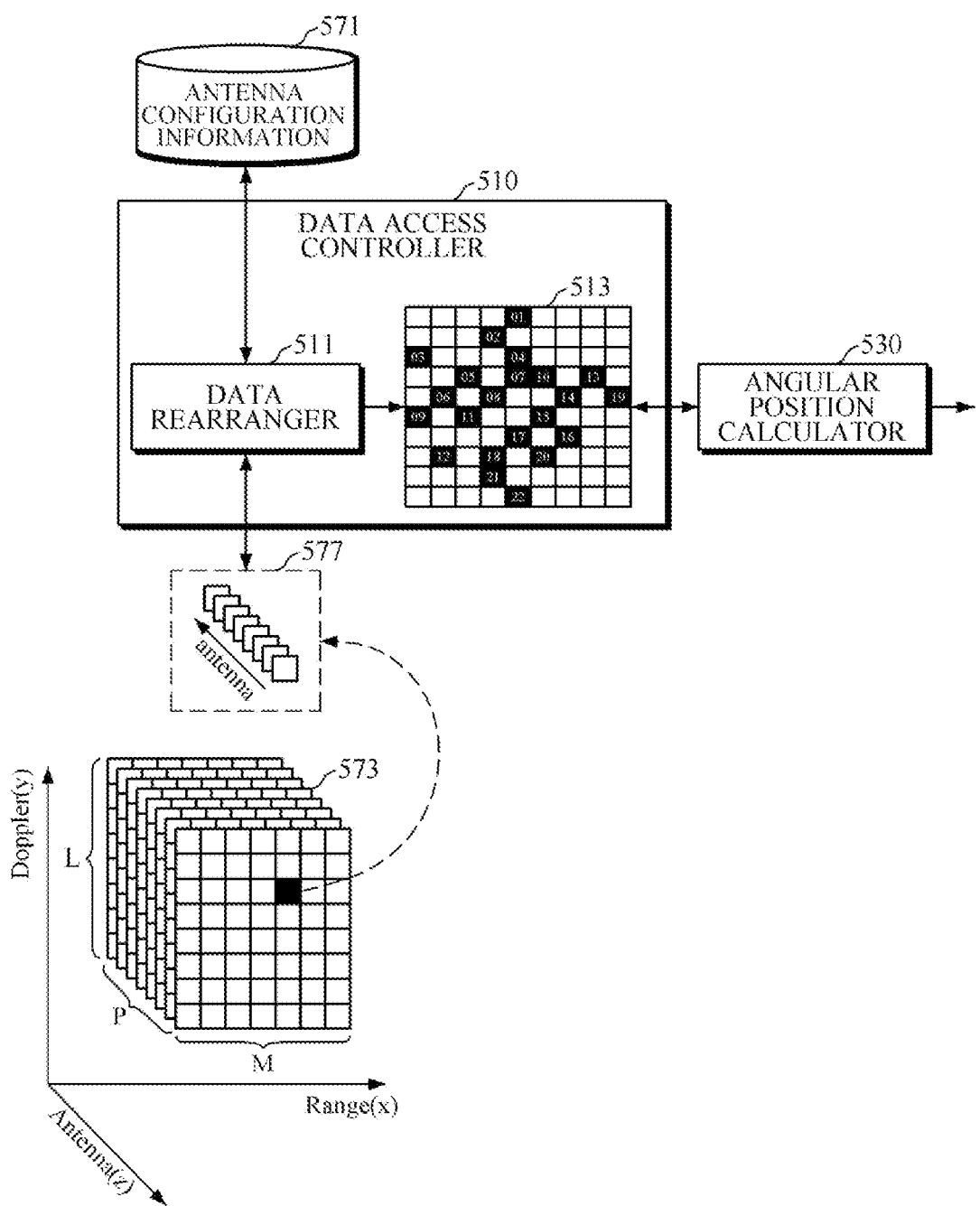
FIG. 9 is a block diagram showing a configuration of a target position calculator according to another exemplary embodiment of the present invention.

[Description of FIG. 9—Detailed Position Calculation of Claims 6 and 7]

FIG. 9 is a block diagram showing a configuration of the target position calculator 500 according to another exemplary embodiment of the present invention. According to another aspect, the data access controller 510 sequentially extracts selected range-Doppler data of a target which is one-dimensionally arranged according to virtual antennas and stores the extracted range-Doppler data at corresponding addresses of the two-dimensionally arranged memory array of virtual antennas with reference to the antenna configuration related information 571. According to an additional aspect, the antenna configuration related information 571 may be information in which corresponding addresses of the spatial arrangement of virtual antennas are listed in the sequence of the virtual antennas in the virtual antenna-specific range-Doppler data.

In this exemplary embodiment, the data access controller 510 may include a data rearranger 511. The data rearranger 511 rearranges range-Doppler data 577 of one target extracted from the range-Doppler data set 573 into arrangement mapped data 513 with reference to the antenna configuration related information 571 according to the spatial arrangement of virtual antennas and stores the arrangement mapped data 513. The angular position calculator 530 may calculate an angular position by processing the arrangement mapped data 513 stored in a memory in the same manner as radar signals to general antennas which are uniformly and linearly deployed.

As shown in the drawing, the range-Doppler data 573 is three-dimensional data set in which M×L range-Doppler data is arranged for each of P virtual antennas. As shown in a square formed of a dotted line, pieces of data at colored positions are extracted from M×L range-Doppler data on the basis of all of the P virtual antennas. The data rearranger 511 extracts specific range-Doppler data from the range-Doppler data set 573 on the basis of all the virtual antennas, rearranges the extracted specific range-Doppler data with reference to the antenna configuration related information 571 according to the positions of the virtual antennas, and stores the rearranged specific range-Doppler data in the memory as the arrangement mapped data 513.

Figure 10:
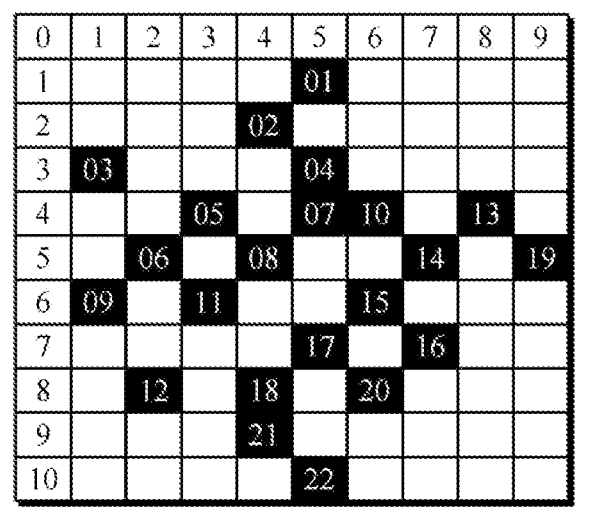

According to an additional aspect, the antenna configuration related information 571 may be information in which corresponding addresses of the spatial arrangement of virtual antennas are listed in the sequence of the virtual antennas in the virtual antenna-specific range-Doppler data. FIG. 10 is a diagram illustrating another example of antenna configuration related information. In the exemplary embodiment shown in the drawing, when the left uppermost corner is (0, 0), the antenna configuration related information may be the following array access sequence information:

(5, 1), (4, 2). (1, 3), (5, 3), (3, 4), (2, 5), (5, 4), (4, 5), . . . .

The data rearranger 511 extracts specific range-Doppler data from a three-dimensional range-Doppler data set in a virtual antenna sequence and sequentially records the specific range-Doppler data at a position of the arrangement mapped data 513 according to the antenna configuration related information described in the above exemplary embodiment. In this exemplary embodiment, the memory is accessed only as many times as the number of the virtual antennas, and thus it is possible to reduce the number of memory access times compared to the exemplary embodiment described above with reference to FIGS. 7 and 8.

Figure 11:
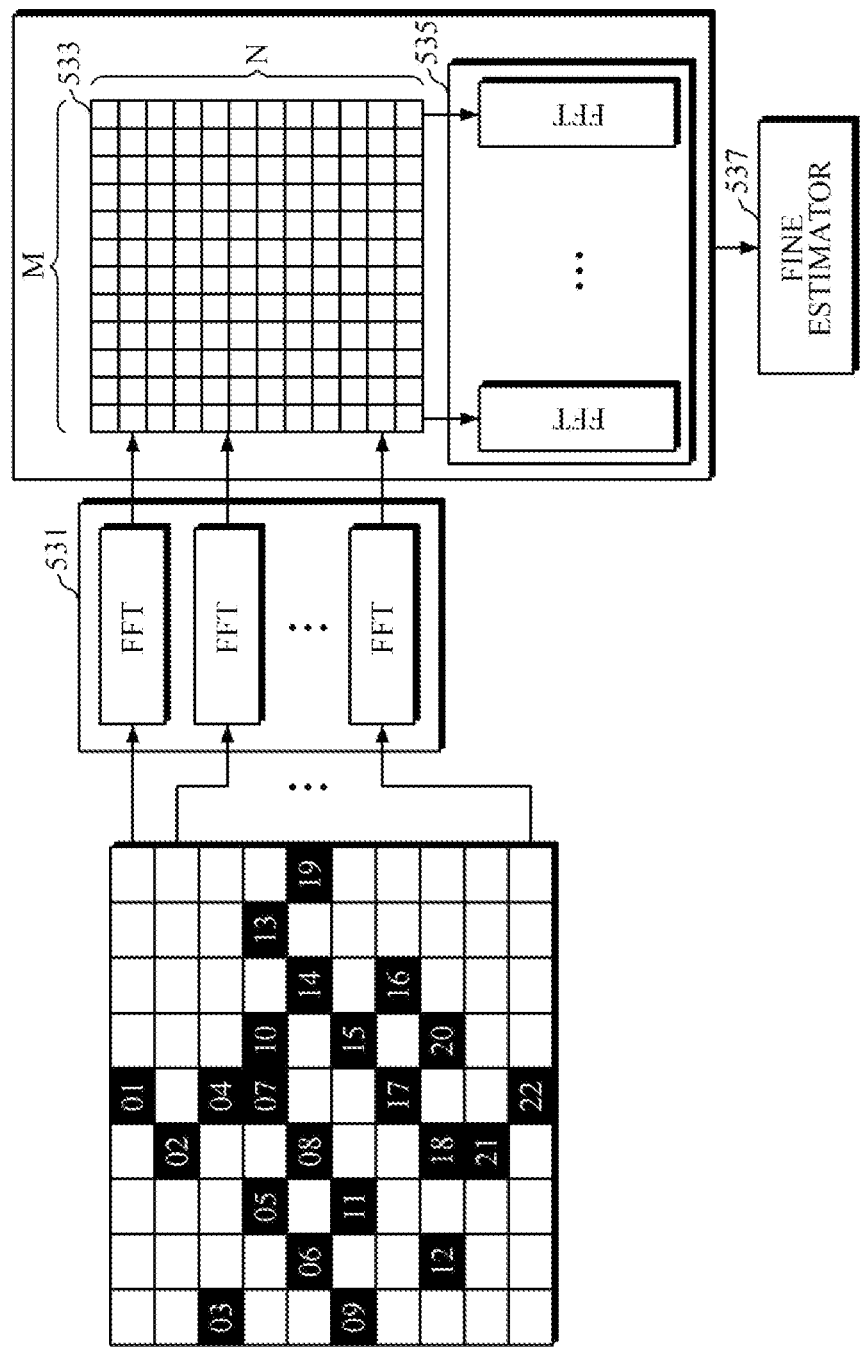
FIG. 11 is a block diagram showing a configuration of an angular position calculator according to an exemplary embodiment of the present invention.

[Description of FIG. 11—Angular Position Calculator]

FIG. 11 is a block diagram showing a configuration of an angular position calculator according to an exemplary embodiment of the present invention.

The angular position calculator 530 according to an exemplary embodiment of the present invention calculates angular positions for respective pairs of range-Doppler data from the rearranged arrangement mapped data. Since pieces of data are aligned by the data access controller 510, the angular position calculator 530 may have the same configuration for angular position calculation as in a general radar having uniformly and linearly deployed antennas. According to an exemplary embodiment, the angular position calculator 530 includes an azimuthal Fourier transformer 531, a buffer memory 533, an elevation Fourier transformer 535, and a fine estimator 537. Each of Fourier transformers in the azimuthal Fourier transformer 531 receives data of one row obtained by extracting the arrangement mapped data output from the data access controller 510 in an azimuth direction, performs a Fourier transformation on the data, and stores the Fourier-transformed data in the buffer memory 533 in a row direction. Each of Fourier transformers in the elevation Fourier transformer 535 receives the data, which has been output from the azimuthal Fourier transformer 531 and stored in the buffer memory 533, column by column, performs a Fourier transformation on the data, and outputs the Fourier-transformed data. The fine estimator 537 projects an input Fourier transformation coefficient array to a beam space, calculates an azimuth and an elevation of a target through fine estimation, and outputs the azimuth and the elevation.

Referring back to FIG. 5, the radar apparatus may further include an antenna arrangement input section 230 according to an additional aspect. The antenna arrangement input section 230 receives and stores information related to a new antenna configuration in the memory 900. When the arrangement of physical antennas is changed, a new antenna is installed, or the radar apparatus is initialized for the first time, antenna configuration related information may be input.

According to an additional aspect, the radar apparatus may further include an antenna operation mode selector 210. The antenna operation mode selector 210 may apply one of multiple antenna configuration related information sets to the radar apparatus according to an operation selection instruction. As an example, the operation selection instruction may be an input of a user. As another example, the operation selection instruction may be an operation selection instruction based on a determination of a controller. Multiple antenna configuration related information sets are provided in the memory 900. Although a physical antenna arrangement is fixed, it is possible to control characteristics of the radar by selectively driving only some of the antennas. As an example, it is possible to select an operation mode for rapidly searching for a target with a low resolution by reducing the number of antennas while maintaining a similar arrangement. As another example, it is possible to select an operation mode in which sensitivity to a specific direction is increased by selectively driving only antennas of the specific direction among the antennas. For example, it is possible to selectively apply a horizontal running mode in which horizontal sensitivity is high and a vertical running mode in which vertical sensitivity is high.

Exemplary embodiments of the present invention have been described above with reference to the accompanying drawings, centering on an apparatus. However, radar signals may be processed by a computer program including instructions which are executed by computing elements such as a digital signal processor or a general-use processor. Some or all of the instructions may be implemented by dedicated hardware or a gate array.

According to the present invention, it is possible to provide a radar which has wide coverage due to the arrangement of a plurality of receiving antennas which are non-uniformly and linearly deployed. Also, radar signals received from the non-uniformly and linearly deployed antennas may be processed using a processing technique for radar signals received from uniformly and linearly deployed antennas. Further, a radar physically having one antenna arrangement may provide multiple different characteristics.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radar apparatus comprising:
    an antenna arrangement including a plurality of transmitting antennas and a plurality of receiving antennas, at least one kind of which are non-uniformly and linearly deployed;
    a sensor signal processor including a range and Doppler processor configured to calculate range-Doppler data for each of virtual antennas from signals input through the plurality of receiving antennas while sequentially driving the plurality of transmitting antennas; and
    a target position calculator configured to calculate position data of a target from arrangement mapped data obtained by rearranging the range-Doppler data calculated by the sensor signal processor according to a two-dimensional arrangement of the virtual antennas,
    wherein the target position calculator includes:
    a data access controller configured to rearrange the range-Doppler data of the targets into target-specific arrangement mapped data according to a two-dimensional spatial arrangement of the virtual antennas and output the target-specific arrangement mapped data; and
    an angular position calculator configured to calculate angular positions of the targets from the target-specific arrangement mapped data.

2. The radar apparatus of claim 1, wherein the sensor signal processor further includes a target selector configured to select and output antenna-specific range-Doppler data of one or more targets which are highly likely to be the target from the calculated range-Doppler data.

3. The radar apparatus of claim 1, wherein the data access controller extracts data, which corresponds to each address of a two-dimensionally arranged memory array of the virtual antennas from the range-Doppler data of the targets, which is one-dimensionally arranged according to the virtual antennas with reference to antenna configuration related information, and stores the corresponding data.

4. The radar apparatus of claim 3, wherein the antenna configuration related information includes information on an index of a virtual antenna of a corresponding position at each address of the memory array having a size identical to a size of the two-dimensional arrangement of the virtual antennas.

5. The radar apparatus of claim 1, wherein the data access controller sequentially extracts the range-Doppler data of the targets which is one-dimensionally arranged according to the virtual antennas and stores the extracted range-Doppler data at corresponding addresses of a two-dimensionally arranged memory array of the virtual antennas with reference to antenna configuration related information.

6. The radar apparatus of claim 5, wherein the antenna configuration related information includes information in which corresponding addresses of the spatial arrangement of the virtual antennas are listed in a sequence of the virtual antennas in the virtual antenna-specific range-Doppler data.

7. The radar apparatus of claim 1, wherein the angular position calculator includes:
    an azimuthal Fourier transformer configured to perform a Fourier transformation on the arrangement mapped data in units of rows in an azimuth direction and output Fourier coefficients;
    an elevation Fourier transformer configured to access the Fourier coefficients output from the azimuthal Fourier transformer in a column direction, perform a Fourier transformation on the Fourier coefficients in units of columns, and output Fourier-transformed data; and
    a fine estimator configured to project the output of the elevation Fourier transformer to a beam space, calculate azimuths and elevations of the targets through fine estimation, and output the azimuths and the elevations.

8. The radar apparatus of claim 5, further comprising an antenna arrangement input section configured to receive and store information related to a new antenna configuration.

9. The radar apparatus of claim 5, further comprising a radar operation mode selector configured to apply one of multiple antenna configuration related information sets according to an operation selection instruction.

10. A radar signal processing method implemented by a computer program including instructions executed by a computing element of a radar connected to an antenna arrangement including a plurality of transmitting antennas and a plurality of receiving antennas, at least one kind of which are non-uniformly and linearly deployed, the method comprising:
    a sensor signal processing operation including a range and Doppler processing operation of calculating range-Doppler data for each of virtual antennas from signals input through the plurality of receiving antennas while sequentially driving the plurality of transmitting antennas; and
    a target position calculation operation of calculating position data of a target from arrangement mapped data obtained by rearranging the range-Doppler data calculated in the sensor signal processing operation according to a two-dimensional arrangement of the virtual antennas,
    wherein the target position calculation operation includes:
    a data access control operation of rearranging the range-Doppler data of the targets into target-specific arrangement mapped data according to a two-dimensional arrangement of the virtual antennas and outputting the target-specific arrangement mapped data; and
    an angular position calculation operation of calculating an angular position for each piece of the range-doppler data from the arrangement mapped data.

11. The radar signal processing method of claim 10, wherein the sensor signal processing operation further includes a target selecting operation of selecting and outputting antenna-specific range-Doppler data of one or more targets which are highly likely to be the target in the calculated virtual antenna-specific range-Doppler data.

12. The radar signal processing method of claim 10, wherein the data access control operation includes extracting data corresponding to each address of a two-dimensionally arranged memory array of the virtual antennas from the range-Doppler data of the targets, which is one-dimensionally arranged according to the virtual antennas with reference to antenna configuration related information, and storing the corresponding data.

13. The radar signal processing method of claim 12, wherein the antenna configuration related information includes information on an index of a virtual antenna of a corresponding position at each address of the memory array having a size identical to a size of the two-dimensional arrangement of the virtual antennas.

14. The radar signal processing method of claim 10, wherein the data access control operation includes sequentially extracting the range-Doppler data of the targets which is one-dimensionally arranged according to the virtual antennas and storing the extracted range-Doppler data at corresponding addresses of a two-dimensionally arranged memory array of the virtual antennas with reference to antenna configuration related information.

15. The radar signal processing method of claim 14, wherein the antenna configuration related information includes information in which corresponding addresses of the spatial arrangement of the virtual antennas are listed in a sequence of the virtual antennas in the virtual antenna-specific range-Doppler data.

16. The radar signal processing method of claim 10, wherein the angular position calculation operation includes:
   an azimuthal Fourier transformation operation of performing a Fourier transformation on the arrangement mapped data in units of rows in an azimuth direction and outputting Fourier coefficients;
   an elevation Fourier transformation operation of accessing the Fourier coefficients output from the azimuthal Fourier transformation operation in a column direction, performing a Fourier transformation on the Fourier coefficients in units of columns, and outputting Fourier-transformed data; and
   a fine estimation operation of projecting the output of the elevation Fourier transformation operation to a beam space, calculating azimuths and elevations of the targets through fine estimation, and outputting the azimuths and the elevations.

17. The radar signal processing method of claim 14, further comprising an antenna arrangement input operation of receiving and storing information related to a new antenna configuration.

18. The radar signal processing method of claim 14, further comprising a radar operation mode selecting operation of applying one of multiple antenna configuration related information sets according to an operation selection instruction.

* * * * *